(12) United States Patent
Ye (10) Patent No.: US 7,092,357 B1
(45) Date of Patent: Aug. 15, 2006

(54) ANTI-FLOODING FLOW-CONTROL METHODS AND APPARATUS

(75) Inventor: Baoqing Ye, Nashua, NH (US)

(73) Assignee: Verizon Services Corp., Arlington, VA (US)

( * ) Notice: Subject to any disclaimer, the term of this patent is extended or adjusted under 35 U.S.C. 154(b) by 922 days.

(21) Appl. No.: 10/010,791

(22) Filed: Nov. 13, 2001

(51) Int. Cl.
H04L 12/26 (2006.01)

(52) U.S. Cl. ............................ 370/230; 370/236

(58) Field of Classification Search ........... 370/229, 370/230, 230.1, 232, 233, 234, 235, 236, 370/236.1, 252, 253
See application file for complete search history.

(56) References Cited

U.S. PATENT DOCUMENTS

| | | | |
|---|---|---|---|
| 6,724,721 B1 * | 4/2004 | Cheriton ................. | 370/229 |
| 6,829,217 B1 * | 12/2004 | Bechtolsheim et al. ..... | 370/229 |
| 2002/0105908 A1 * | 8/2002 | Blumer et al. ............ | 370/230 |
| 2002/0141341 A1 * | 10/2002 | Haggar et al. ........... | 370/232 |
| 2003/0035370 A1 * | 2/2003 | Brustoloni ............... | 370/229 |
| 2005/0226149 A1 * | 10/2005 | Jacobson et al. ......... | 370/229 |

OTHER PUBLICATIONS

H-Y Chang S. F. Wu, C. Sargor, and X. Wu, "Towards Tracing Hidden Attackers on Untrusted IP Networks", pp. 1-19.
S. Savage, D. Wetherall, A. Karlin and T. Anderson, "Practical Network Support for IP Traceback", Technical Report UW-CSE-00-02-01, University of Washington, 6 pgs.
"Characterizing and Tracing Packet Floods Using Cisco Routers", downloaded from: wysiwyg://23/http://www.cisco.com/warp/public/707/22.html, 5 pgs.
"Cert® Advisory CA-1996-26 Denial-of-Service Attack via ping", downloaded from: http://www.cert.org/advisories/CA-1996-26.html, 4 pgs., last revised Dec. 5, 1997.
"Cert® Advisory CA-1996-21 TCP SYN Flooding and IP Spoofing Attacks", downloaded from: http://www.cert.org/advisories/CA-1996-21.html on Mar. 14, 2002, pp. 1-8, last revised Nov. 29, 2000.
S. Blake, D. Black, M. Carlson, E. Davies, Z. Wang, W. Weiss, "An Architecture for Differentiated Services", Network Working Group Request For Comments: 2475, downloaded from: ftp://ftp.isi.edu/in-notes/rfc2475.txt on Mar. 14, 2002, Dec. 1998, pp. 1-32.
L. Houvinen and J. Hursti, "Denial of Service Attacks: Teardrop and Land", Department of Computer Science Helsinki University of Technology, downloaded from: http://www.hut.fi/~ilhuovine/hacker/dos.html on Mar. 14, 2002, pp. 1-12.

(Continued)

*Primary Examiner*—Chau Nguyen
*Assistant Examiner*—Tito Pham
(74) *Attorney, Agent, or Firm*—Leonard C. Suchyta, Esq.; Joel Wall, Esq.; Straub & Pokotylo (57) ABSTRACT

Methods and apparatus for providing an Anti-Flooding Flow-Control (AFFC) mechanism suitable for use in defending against flooding network Denial-of-Service (N-DoS) attacks is described. Features of the AFFC mechanism include (1) traffic baseline generation, (2) dynamic buffer management, (3) packet scheduling, and (4) optional early traffic regulation. Baseline statistics on the flow rates for flows of data corresponding to different classes of packets are generated. When a router senses congestion, it activates the AFFC mechanism of the present invention. Traffic flows are classified. Elastic traffic is examined to determine if it is responsive to flow control signals. Flows of non-responsive elastic traffic is dropped. The remaining flows are compared to corresponding class baseline flow rates. Flows exceeding the baseline flow rates are subject to forced flow rate reductions, e.g., dropping of packets.

14 Claims, 6 Drawing Sheets

OTHER PUBLICATIONS

SecurityFocus home mailing list: BugTraq "The "mstream" distributed denial of service attack tool", downloaded from: http://online.securityfocus.com/archive/1/57854 on Mar. 14, 2002, May 1, 2000, pp. 1-22.

Bellovin and Leech AT&T Labs Research, "ICMP Traceback Messages", Network Working Group Internet Draft, downloaded from: http://www.ietf.org/internet-drafts/draft-ietf-itrace-00.txt on Jul. 9, 2001, Mar. 2001, pp. 1-9.

S. Floyd and V. Paxson, "Why We Don't Know How To Simulate The Internet", AT&T Center for Internet Research, Oct. 11, 1999, pp. 1-13.

S. Floyd and K. Fall, "Promoting the Use of End-to-End Congestion Control in the Internet", May 3, 1999, pp. 1-16.

K. Thompson, G. J. Miller, and R. Wilder, "Wide-Area Internet Traffic Patterns and Characteristics", IEEE Network, Nov./Dec. 1997, pp. 10-23.

S. Floyd and V. Jacobson, "Link-sharing and Resource Management Models for Packet Networks", IEEE/ACM Transactions on Networking, vol. 3, No. 4, Aug. 1995, 22 pgs.

S. Floyd and V. Jacobson, "Random Early Detection Gateways for Congestion Avoidance", Lawrence Berkeley Laboratory University of California, 1993, pp. 1-22.

* cited by examiner

Class Flow Baseline Table For Destination D2 — 400

| | 402 | 404 | 406 | 408 |
|---|---|---|---|---|
| Protocol Type | TCP | TCP | UDP | UDP |
| Application Type | Web | FTP | Echo | DNS |
| Average Baseline (Arrival Rate bit/sec) | 1000 | 500 | 200 | 100 |
| | Class 1 | Class 2 | Class 3 | Class 4 |

Figure 6

Flow Statistics Before Processing — 600

| Traffic Type | Elastic | | | | | | Best-Effort | | |
|---|---|---|---|---|---|---|---|---|---|
| Protocol Type | TCP | | | TCP | | | UDP | | UDP |
| Application Type | Web | | | FTP | | | Echo | | DNS |
| Arrival Rate | 3500 | | | 1100 | | | 780 | | 290 |
| Flow (s) | F1 | F2 | F3 | F4 | F5 | F6 | F7 | F8 | F9 |
| Arrival Rate Per Flow | 800 | 1200 | 1500 | 700 | 400 | 180 | 500 | 200 | 90 |
| | Class 1 | | | Class 2 | | | Class 3 | | Class 4 |

Figure 7

Traffic Throughput After Processing — 700

| Traffic Type | Elastic | | | | | | Best-Effort | | |
|---|---|---|---|---|---|---|---|---|---|
| Protocol Type | TCP | | | TCP | | | UDP | | UDP |
| Application Type | Web | | | FTP | | | Echo | | DNS |
| Throughput (bit/sec) | 1800 | | | 400 | | | 380 | | 200 |
| Flow (s) | F1 | F2 | F3 | F4 | F5 | F6 | F7 | F8 | F9 |
| Responsiveness | YES | YES | NO | NO | YES | N/A | N/A | N/A | N/A |
| Aggressiveness | NO | YES | YES | YES | NO | NO | YES | YES | NO |
| Throughput | 800 | 1000 | 0 | 0 | 400 | 180 | 200 | 100 | 90 |
| | Class 1 | | | Class 2 | | | Class 3 | | Class 4 |

ANTI-FLOODING FLOW-CONTROL METHODS AND APPARATUS

FIELD OF THE INVENTION

The present invention is directed to communication systems, and more particularly, to flow control methods and apparatus suitable for use in network congestion control, especially when systems are under flooding Denial-of-service attacks.

BACKGROUND OF THE INVENTION

Data networks are used today to transmit vast amounts of data. Such networks comprise elements sometimes called nodes. Nodes may be, e.g., routers, switches, and/or end-hosts. Among those nodes, routers or switches are called network nodes. End-hosts can serve as the source or destination of data transmitted through a network. In many packet networks, data is transmitted between a source and destination device as a flow of packets. Flows of packets can be categorized by a wide range of factors including, e.g., the type of protocol used to form and/or transmit the packet and/or the specific type of application to which the packet corresponds.

As known in the art, it is common to monitor traffic flows and store flow statistics in a database, e.g., for purposes of load balancing and traffic route determination. Gathered traffic information for a node typically includes information such as packet flow rates and, for each flow, protocol type, application type, source IP address, source port number, destination IP address, destination port number, etc. Such detailed statistics along with information about the time periods in which such statistics are gathered can be used to group traffic flows into a wide number of classes depending on the intended purpose of grouping the traffic.

Flooding Network DoS (N-DoS) attacks occur in a network when one or more sources send large amounts of data to a destination node, e.g., web page server, in an attempt to interfere with the normal servicing of traffic at the destination node. Flows of traffic used to implement N-DoS attack can be considered malicious since their purpose is to interfere with the communication and servicing of legitimate network traffic.

Malicious flows associated with an flooding N-DoS attack often create congestion at certain nodes located prior to, i.e., upstream from, the flow's destination node. The nodes at which congestion occurs are sometimes referred to as bottleneck nodes.

As a result of malicious sources flooding a bottleneck node with traffic, legitimate traffic passing through the bottleneck node may be subject to dropping of packets thereby preventing legitimate communications. Thus, N-DoS attacks negatively effect legitimate users, and/or even cause its victim's services (e.g. web sites) to crash due to excessive loading.

One known technique for protecting against N-DoS attacks involves explicit signature capture and analysis. For example, those signatures can be communication port numbers, daemon names or commands, or contained in IP packet payload. Unfortunately these approaches can be ineffective and may result in negative consequences for legitimate users, because the signatures can change over time making a captured signature useless in identifying a malicious source during a subsequent attack.

Another disadvantage of the signature capture system is that the signature collection methods are an aftermath defense approach. Thus, such an approach helps in preventing future attacks with known signatures, but is of limited use during initial attacks.

In view of the above discussion, it is apparent that there is a need for methods of effectively identifying malicious traffic flows, e.g., traffic flows from individuals and/or sources involved in launching an N-DoS attack. There is also a need for methods and apparatus for reducing and/or eliminating the effects of malicious traffic flows associated with N-DoS attacks. It is desirable that at least some congestion control methods be capable of limiting malicious traffic prior to a significant collapse or restriction on legitimate network traffic occurs.

SUMMARY OF THE INVENTION

The present invention is directed to congestion control methods and apparatus. Various methods and apparatus of the invention are well suited for defending against flooding network Denial-of-Service (N-DoS) attacks.

An Anti-Flooding Flow-Control (AFFC) mechanism of the present invention monitors, analyzes, and regulates traffic flows at network nodes, e.g., routers, based on the flow's behavior. In a node, the AFFC mechanism of the invention, utilizes a traffic baseline generating module, a dynamic buffer manager module, a packet scheduler module, and optionally, an early traffic regulator (ETR) module. Each module may be implemented using software and/or hardware.

In some embodiments traffic baselines are generated external to a node using traffic information for the particular node. The generated baselines are then supplied to the dynamic buffer manager and packet scheduler in the node. In such embodiments, the traffic baseline module may be implemented as a stand-alone device separate from packet forwarding nodes. This can reduce the processing burden placed on such nodes by the AFFC methods of the invention.

While the AFFC mechanism can be implemented in a single node, for more effective network protection it can be implemented in multiple network nodes. AFFC modules, e.g., ETR modules, of different nodes may, and in various embodiments do, interact with one another to perform a multi-node approach to congestion control.

The traffic baseline generating module receives and analyzes traffic statistics to generate baseline flow statistics, e.g., diurnal flow statistics, for individual periods of time, e.g., hours or minutes of a day in a week. The traffic baselines are generated for each node based on the traffic through the node over an extended period of time, e.g., multiple weeks.

As part of the flow control method, the current data flow rates are compared to the corresponding baseline flow rate for the same period of time and type of traffic. Flows are determined to be aggressive if they have an arrival rate that is higher than the baseline for flow of its type. In accordance with the present invention, under certain circumstances aggressive flows are targeted for forced data rate reductions. In addition to aggressive flows, unresponsive elastic flows may be blocked independently of traffic baselines.

The dynamic buffer manager module 224 and packet scheduler module 226 are the mechanisms by which forced reductions in data flow rates are implemented at a node in response to the presence of congestion. In accordance with the invention the forced data flow reduction functionality of the buffer manager and packet scheduler normally remain inactive. However, when congestion is detected or a control message is received from another network node as part of the ETR method of the invention, the forced data flow reduction functionality in a node is activated. An ETR message triggering activation of the buffer manager and packet scheduler functionality may be received from, e.g., a downstream node confronting a potential collapse due to congestion.

The dynamic buffer manager module 224 of the invention determines packet dropping rates to be applied to different data flows, e.g., those flows identified as being allowable but aggressive. The packet scheduler module 226 determines current packet forwarding rates, e.g., flow rates.

During periods of congestion during which the forced data flow reduction is applied, incoming data flows are processed based on their traffic types, elastic traffic and best effort traffic. Elastic traffic, which is not responsive to congestion signaling, e.g., ECN (Explicit Congestion Notification) or packet dropping, is considered malicious and dropped.

Elastic traffic that is responsive to congestion signals is considered allowable.

For both elastic traffic and best-effort traffic, allowable traffic flows are determined to be aggressive if the flow rate of the allowable flow exceeds a corresponding baseline flow rate. Allowable non aggressive flows, e.g., flows having a flow rate equal to or lower than a corresponding baseline flow rate are forwarded without being subject to flow rate reduction. Allowable flows that are found to be aggressive, are subject to forced reductions in their flow rates during periods of congestion. The applied flow rate reduction may, e.g., reduce the flow rate of an aggressive flow, to or below the corresponding flow rate baseline.

To support different packet drop rates for each allowable aggressive flow, packets from different allowable aggressive flows are stored in different packet forwarding queues. e.g., one per allowable aggressive flow. In some embodiments, e.g., where sufficient memory is not available to support one queue per flow, a group of flows (e.g. from the same domain) may be processed per queue.

The dynamic buffer manager module 224 of the invention determines packet dropping rates to be applied to different data flows, e.g., those flows identified as being allowable but aggressive. The packet scheduler module 226 determines current packet forwarding rates, e.g., flow rates. As mentioned above, the current flow rates are compared to the baseline flow rates and packets are dropped, e.g., when the current flow rate exceeds the baseline flow rate. Accordingly, incoming flows are subject to different reductions in their flow rates as a function of their normal baselines and their current arrival rates. In the case of malicious traffic flows, such forced data rate reductions may be interpreted as punishing of the malicious flows.

ETR is a mechanism by which congestion control, and forced data rate reductions can be triggered in nodes upstream of a bottleneck node where the congestion occurs. ETR messages are used to activate flow reduction in the upstream nodes. Thus ETR offers protection for downstream nodes facing potential collapse due to congestion by reducing the flow of traffic directed to the node suffering from congestion.

Numerous additional features and advantages of the invention are discussed in the detailed description which follows.

DETAILED DESCRIPTION

The present invention is directed to congestion control methods and apparatus. The methods and apparatus of the present invention are well suited for defending against network Denial-of-Service (N-DoS) attacks.

Figure 1:
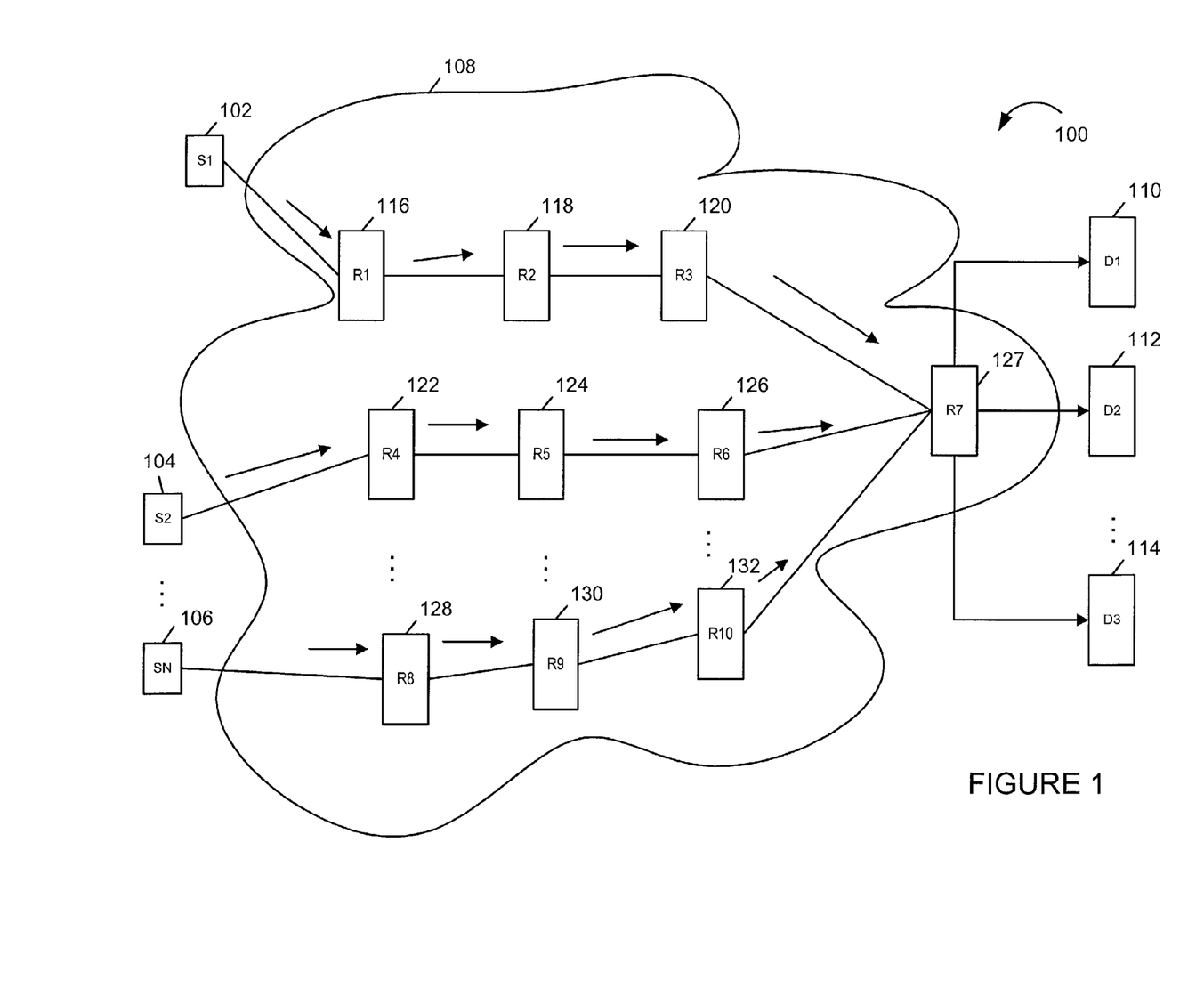
FIG. 1 illustrates a communications system incorporating nodes that implement the present invention.

FIG. 1 illustrates a communications system 100 implemented in accordance with the present invention. The system 100 comprises a plurality of sources 102, 104, 106, an internet 108 and a plurality of destination nodes 110, 112, 114. The internet 108 may be a corporate internet or the world wide Internet. The internet 108 comprises a plurality of nodes R1 through R10 116, 118, 120, 122, 124, 126, 127, 128, 130, 132 connected together as shown in FIG. 1 by the use of solid lines. Each of the nodes may be, e.g., a router or a switch. Arrows are used in FIG. 1 to indicate the flow of packets, e.g., between source devices S1, S2, . . . , SN, 102, 104, 106 and destination device 112. While FIG. 1 shows flows of packets to destination device D2 112 from sources S1, S2, . . . , SN, 102, 104, 106 the communications paths in the system 100 between the routers and devices are bi-directional allowing for responses, e.g., packets and messages, to be transmitted in the reverse direction as well. In the FIG. 1 embodiment source S1 102 is coupled to the internet 108 by router R1 116. In addition, source S2 is coupled to the internet 108 by router R4 122, while source SN 106 is coupled to the internet 108 by router R8 128. Router R7 127 couples each of the three destination devices, D1 110, D2 112, and D3 114, to the internet 108. As a result packets from any one of the sources 102, 104, 106 will pass through router R7 prior to reaching one of the destination devices 110, 112, 114.

Since traffic directed to a destination device, e.g., device D2 112, will pass through the router R7 127 regardless of the source of the traffic, router R7 127 represents a potential congestion point. For purposes of explaining the invention, router R7 127 will be referred to as a "bottleneck" node since it is the point in system 100 where traffic bottlenecks may occur when excessive amounts of traffic are directed to one of the destination devices D1, D2, D3 110, 112, 114. Relative to the bottleneck node 127, system elements, e.g., routers and sources located to the left of bottleneck node 127, are upstream nodes. System elements, e.g., devices D1, D2, D3 110, 112, 114 to the right of the bottleneck node 127, are downstream nodes since they follow bottleneck node 127 in terms of the exemplary traffic flows shown in FIG. 1.

A flooding N-DoS attack works by transmitting a large amount of traffic from one or more sources to a particular destination, e.g., a web page server, which is the target of the N-DoS attack. For purposes of explaining the invention, when discussing an exemplary N-DoS attack it will be assumed that destination device D2 112 is the target of the exemplary attack. The exemplary N-DoS attack will result in bottleneck node 127 being flooded with useless information, corresponding to malicious data flows associated with the N-DoS attack.

Figure 2:
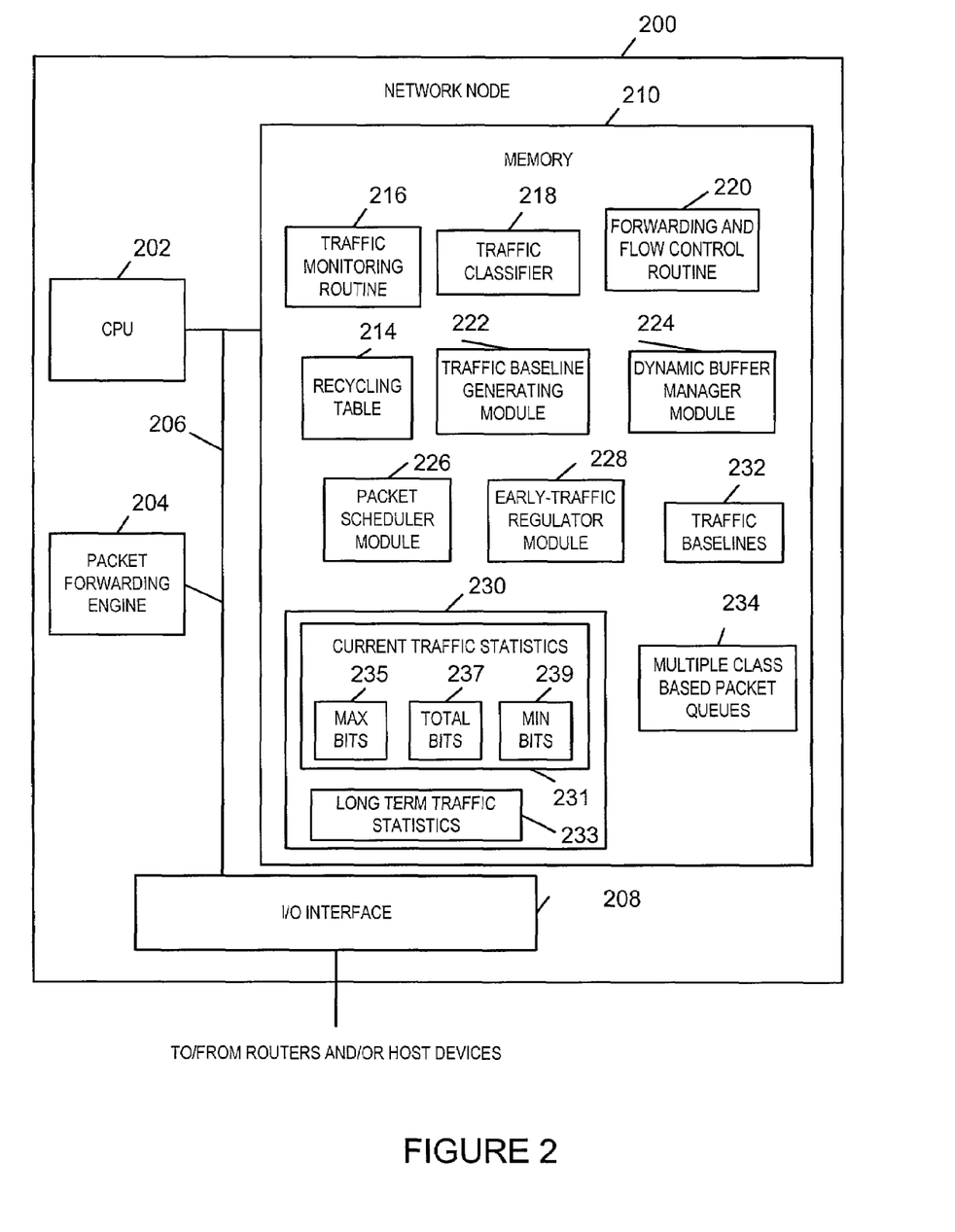
FIG. 2 illustrates an exemplary router implemented in accordance with the present invention that may be used as one of the routers shown in FIG. 1.

FIG. 2 illustrates an exemplary router 200 implemented according to one embodiment of the present invention. The router 200 may be used as, any one of the routers shown in FIG. 1 including edge router 127 which serves for discussion purposes as the exemplary bottleneck node. Router 200 comprises of a CPU 202, a packet forwarding engine 204, an I/O interface 208 and a memory 210. These elements are coupled together by bus 206.

The CPU 202 controls operation of the router 200 under direction of various routines stored in memory 210. The packet forwarding engine 204 is responsible for controlling the forwarding of packets under direction of various routines executed by the CPU 202. As part of the forwarding process packet forwarding engine 204 may store received packets corresponding to different flows and/or classes in different queues. In accordance with the congestion control mechanisms of the present invention some received packets may be dropped by the packet forwarding engine, e.g., when the router 200 is incapable of forwarding packets at the rate at which they are received. The I/O interface 208 couples the router to other routers and/or host devices, e.g., source and/or destination devices. Thus, via I/O interface 208 the router 200 receives and transmits packets.

Memory 210 includes a traffic monitoring routine 216, traffic classifier 218, forwarding and flow control routine 220, traffic baseline generating module 222, dynamic buffer manage module 224, packet schedule module 226, early traffic regulator (ETR) module 228, traffic statistics 230, traffic baselines 232, a Recycling table 214, and a plurality of class based packet queues 234. The traffic statistics 230 include current traffic statistics 231 and long term, e.g., weekly traffic statistics 233. The various modules 222, 224, 226, 228 may be implemented as, e.g., software routines. Alternatively, the modules could be implemented in hardware, e.g., in the router 200, to enhance processing speed.

The traffic monitoring routine 216 monitors to detect when the rate at which packets are received exceeds the maximum forwarding packet rate of the router 200 for a period of time corresponding to the buffering capacity of the router 200. This condition corresponds to saturation at the router 200 necessitating the dropping of some received packets. The traffic monitoring routine 216 notifies the forwarding and flow control routine 220 when saturation occurs and the length of the period of saturation.

The traffic classifier 218 is used to classify packets into different classes and/or flows of traffic based on such factors as source address, destination address, protocol type, and application type. The application type is determined from the port number or message type information included in a packet. The level, e.g., resolution, of traffic classification applied by the classifier 218 may depend on the application for which the classifier is being used. The traffic classifier can be called by the traffic baseline generating module 222 and/or the forwarding and flow control routine 220 during normal operation.

Forwarding and flow control routine 220 is responsible for controlling the forwarding and flow control of packets in accordance with the present invention. The forwarding and flow control routine 220 is responsible for activating the dynamic buffer manager module 224, packet scheduler module 226 and early traffic regulator module 228 used to implemented forced reductions in flow data rates in accordance with the present invention when the router 200 is saturated by packet traffic, e.g., for a preselected period of time. By limiting implementation of all or some of the flow reduction features of the present invention until saturation of a node has occurred for a period of time, application of the anti-flooding flow reduction techniques can be limited to cases where flooding is likely to be occurring or to cases where a traffic collapse at the node is likely to occur if steps are not taken to avoid the collapse. In addition, false alarms of which can be induced by occasional short-term traffic spikes can be reduced or eliminated.

Traffic baseline generating module 222 operates in parallel with the forwarding and flow control routine 220 to generate traffic baselines for various traffic flows at preselected intervals. As will be discussed below, the traffic baselines 232 are generated from the traffic statistics 230 which are produced over an extend period of time, e.g., days or weeks. Traffic baselines 232 are stored in memory for use in forced traffic flow reduction operations implemented in the router 200 in accordance with the invention.

The dynamic buffer manager module 224 and packet scheduler module 226 implement in accordance with the invention are responsible for performing forced reductions in the rate of packet flows through the router 200. The amount of the flow reduction applied to individual flows or flow groups is determined as a function of the traffic baselines 232.

Early traffic regulator module 228 is used to send early traffic regulation (ETR) signals, e.g., messages, to upstream nodes to trigger the congestion control and forced packet flow reductions techniques of the present invention to be implemented in the upstream node. In the case of a node receiving an ETR message, the ETR module 228 is responsible for responding to the ETR message by implementing forced packet flow rate reductions. In some embodiments the forced packet flow rate reductions in response to an ETR message are on flows directed to the node which was the source of the ETR message while in other embodiments, the forced packet flow rate reductions are limited to flows destined for target IP address(es) identified in the received ETR message.

Figure 3:
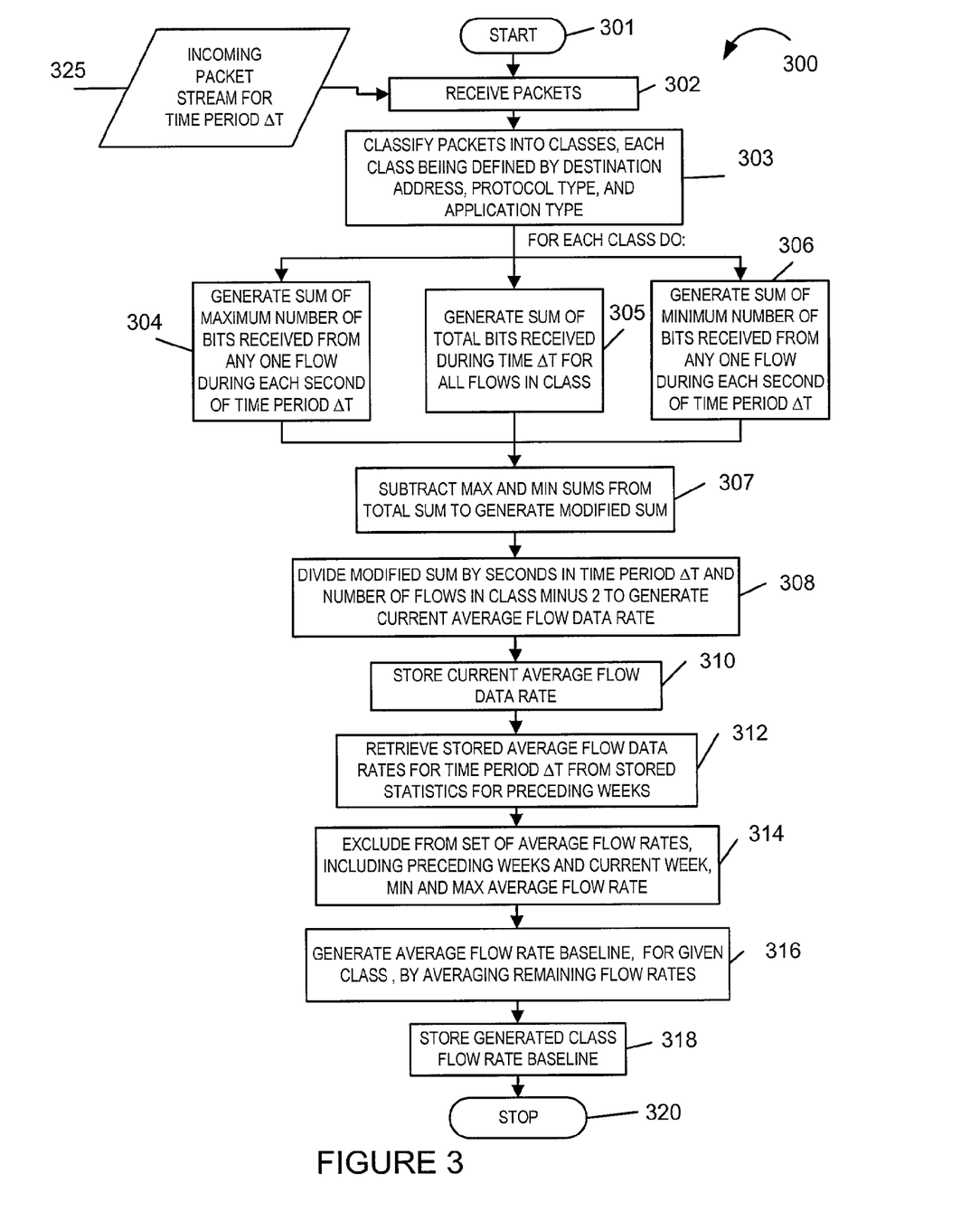
FIG. 3 illustrates the steps of an exemplary traffic baseline generation routine of the invention.

An exemplary traffic baseline generating routine 300, which can be used as the traffic base line generating module 222, is shown in FIG. 3.

Traffic baseline generation involves removing spikes in a time window corresponding to a daily period of time and removing short-term abnormal traffic patterns which may be encountered over a period of weeks. Furthermore, depending on the implementation, traffic classification for baseline generation purposes need not be limited to simply protocol types and IP addresses but may also be based on the application type and/or port numbers associated with packets.

The routine 300 starts in step 301 wherein the routine is executed by the CPU 202. Then in step 302, packets 325 for a current time period $\Delta T$ are received. The time period $\Delta T$ may be fixed or any desired length depending on the environment and specific traffic patterns and/or day and time of week for which the flow rate baseline is being generated. The packets 325 correspond to multiple destination addresses and sources. Accordingly, many flows of traffic are represented in the received packet stream 325. Each packet includes source IP addresses, destination IP addresses, protocol type information, port number and/or message type information. As discussed above, port number and/or message type information can be used to identify an application to which the packet corresponds. ΔT in the exemplary embodiment is a time segment, e.g., 30 minute time segment, from a 24 hour time period. ΔT can be either constant through the day, e.g., 30 minutes, or vary at different time of the day, e.g., 120 minutes from 2 A.M. to 4 A.M. vs. 30 minutes for other busier times of the day. Holidays may be treated as special cases for purposes of data collection and baseline generation if desired, e.g., due to very different traffic patterns on those days.

In step 303, each packet is classified based on destination address, protocol type and application type. The resulting sets of data correspond to individual classes of traffic.

Some exemplary protocol types are TCP and UDP, while some exemplary applications that use TCP are web traffic and FTP traffic. An exemplary application that uses UDP is Echo traffic. Accordingly, the first exemplary traffic class might include TCP packets for an FTP application directed to a first destination. A second exemplary traffic class might include TCP packets for a web application directed to the same destination. Numerous other traffic classes are possible with the granularity of the class being a matter of design choice.

Each class will normally include multiple flows with the number of bits received in each flow varying as a function of time. The number of bits received in each second by each flow in a class is used in steps 304, 305, and 306, which operate in parallel.

In step 304, a sum of the maximum number of bits received from any one flow during each second of time period ΔT is generated. The running maximum sum, tends to be larger than the number of bits received in any one of the flows since it may be generated from values obtained from different flows.

In step 305, a sum of the total bits received by the node for all the flows in the class being processed during time ΔT is generated.

In step 306, a sum of the minimum number of bits received from any one flow during each second of time period ΔT is generated. This running minimum sum tends to be smaller than the minimum number of bits received in any one of the flows since it may be generated from values obtained from different flows.

The running sums of max, min and total bits received are stored in memory elements 235, 237, 239 during processing.

Once the maximum, total, and minimum number of bits are determined for time period ΔT in steps 304, 305, 306 operation proceeds to step 307. In step 307, the max and min sums are subtracted from the total number of bits to generate a smoothed total sum.

In step 308, the smoothed total sum is divided by the number of seconds in the time period ΔT and the number of flows in the class being processed minus 2. The subtraction of 2 from the total number of flows represents the elimination of bits corresponding to the composite min and max data flows used to reduce the impact of transient or abnormal flow characteristics. The result of the division operation is a smoothed average value, the current average flow data rate.

The current average flow data rate is then stored in step 310 thereby updating the set of long term, e.g., multi-week, traffic statistics 233.

The traffic baseline generating method 300 continues in step 312 by retrieving stored average flow data rates for the corresponding time periods ΔT generated from statistics 233 for the preceding weeks. For example, average flow rates may be retrieved in step 312 from the long term traffic statistics 233 for the four weeks preceding the current time period.

Once again, to reduce the risk of flow rate anomalies having a large impact on a class baseline, in step 314, the minimum and maximum average flow rates, from the set of average flow rates including the average flow rates for the preceding weeks and the current week, are excluded from the set of data used for generating the class flow rate baseline. Assuming the flow rates for 4 preceding weeks were retrieved in step 312, excluding the minimum and maximum average weekly flow rates will result in 3 average weekly flow rates remaining for the traffic class being processed.

In step 316 the flow rate baseline for the class of traffic being processed is generated by averaging the remaining average weekly flow rates. Next, in step 318 the generated flow rate baseline for the traffic class being processed is stored, e.g., in the set of baseline statistics 232. The most recent class flow baseline for a particular time period may replace a previously generated baseline for the same time period thereby ensuring that the set of traffic baselines 232 includes the most recently generated baseline flow rates for the various classes of traffic and time periods of interest.

In the above described manner, flow rate baselines are generated for a class based on packet arrival rates. Alternatively, such baselines could be generated from other flow statistics, e.g., packet forwarding rates.

After flow rate baselines are generated for each class of traffic for which flow rate information is received, the flow rate baseline generation process stops in step 320 pending receipt of another set of flow packets for processing in the next time period ΔT'.

While baselines are described as being generated in the above described manner for classes defined by destination address, protocol type, and application type, classes may be defined with less granularity, e.g., without considering application type or port number. In such cases, flow rate baselines for the classes can be generated by applying steps 304, through 318 to the traffic corresponding to each class as defined for the particular application.

Figure 4:
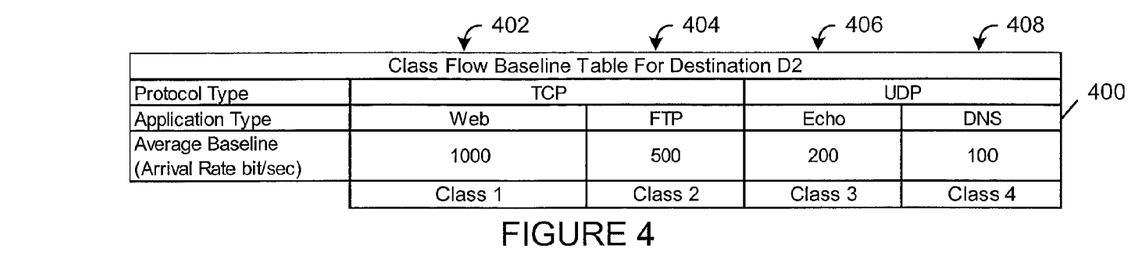
FIG. 4 illustrates an exemplary flow baseline table generated and used in accordance with an embodiment of the present invention.

FIG. 4 illustrates an exemplary flow baseline table 400 for a single destination address. The traffic baselines 232 include information of the type shown in FIG. 4, for each destination address of interest, e.g., each downstream web server likely to be the target of a N-Dos attack.

The table 400 includes base lines for four different classes of packet traffic corresponding to a single destination address D2. In FIG. 4, each column 402, 404, 406, 408 corresponds to a different traffic class as defined, for the given destination address, by the protocol type (TCP or UDP) and application type (Web, FTP, Echo, or DNS), as determined by port number and/or message type. The second from the last line of the table 400 indicates the baseline flow rate for each class. Directly below each baseline flow rate is listed the class to which it applies.

In the FIG. 4 example, class 1 which corresponds to Web traffic has a baseline flow rate of 1000 bits/s per flow. Class 2 which corresponds to FTP traffic has a baseline flow rate of 500 bits/s. In addition class 3 which corresponds to Echo traffic has a baseline flow rate of 200 bits/s while class 4 which corresponds to DNS traffic has a baseline flow rate of 100 bits/sec.

Figure 5:
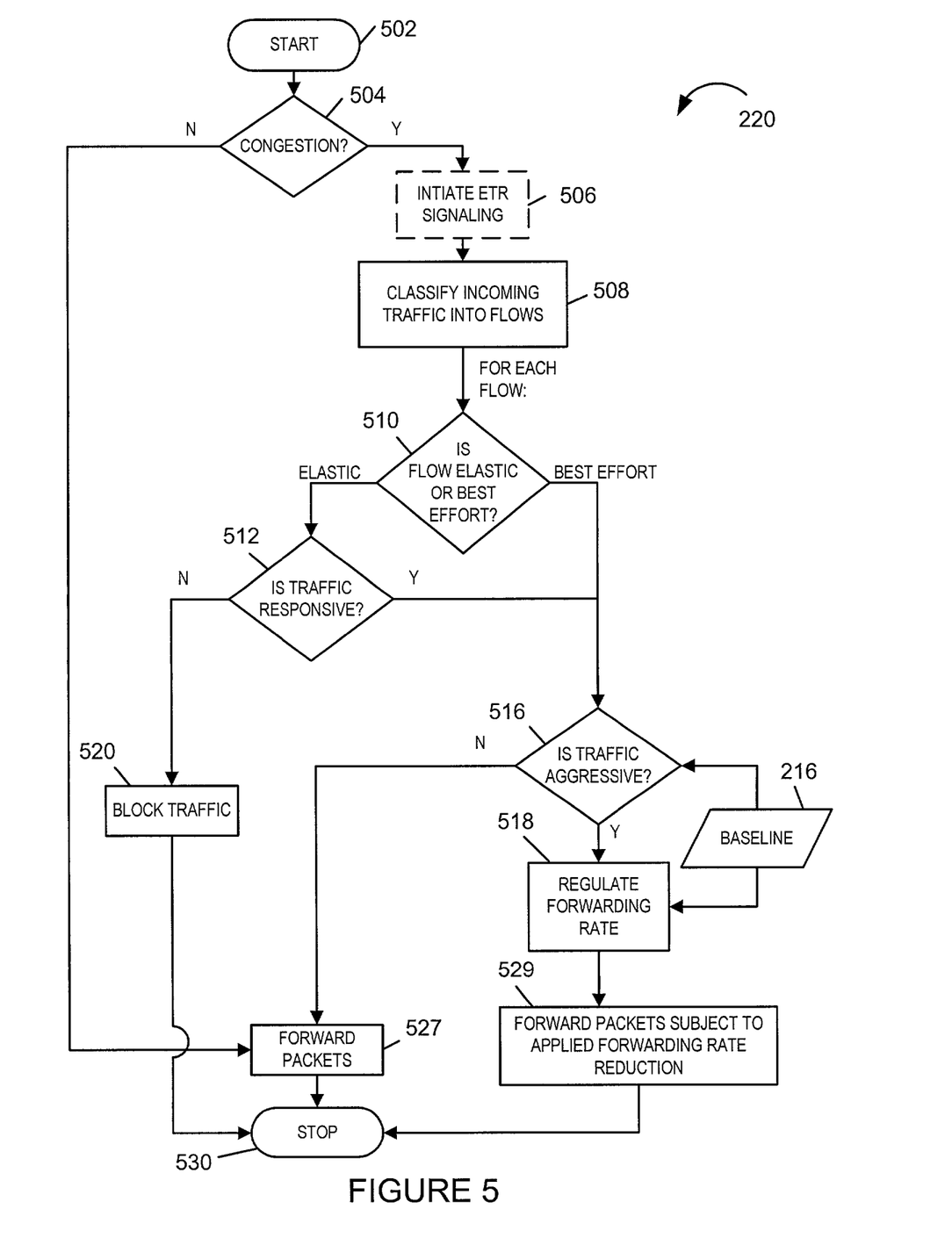
FIG. 5 illustrates the steps of an Anti-Flooding Flow-Control (AFFC) method implemented in accordance with an exemplary embodiment of the present invention.

The packet forwarding and flow rate control routine of the present invention will now be described with reference to FIG. 5. FIG. 5 illustrates an exemplary forwarding and flow rate control routine.

The routine 220 begins in step 502 when the router which includes the routine is activated and the routine is executed. Once the routine 220 is activated, control step 504 is performed on an ongoing basis. Control step 504 involves making a determination as to whether the router is currently experiencing congestion sufficient to merit the application of the AFFC mechanisms supported by the dynamic buffer manager module 224, packet scheduler module 226 and, optionally, the early traffic regulator module 228. In step 504, congestion sufficient to merit application of the AFFC flow control mechanisms is declared when the router encounters a saturation condition which persists for a pre-selected period of time, e.g., a period of time indicative of persistent and potentially hostile volumes of traffic.

In one particular embodiment, the congestion decision of step 504 is made based on two conditions to reduce false positives, the first condition is that the summation of total bandwidth shares at the node must saturate the node and second, the saturation condition must persist for a window period after the saturation condition initially occurs. In such an embodiment, congestion is declared in step 504 when the two conditions are met. Congestion is no longer found to be present when the saturation condition ceases to be encountered for the set period of time in which it was required to occur before congestion was declared.

When control step 504 determines that congestion does not exist, operation proceeds directly to step 527 with the received packets being forwarded without being subject to processing in accordance with the invention to reduce the flow rates of specific identified traffic flows.

However, when control step 504 detects the presence of congestion, e.g., the two conditions above are satisfied, traffic is processed along the path which proceeds to step 508 via optional step 506.

In optional step 506, ETR signaling is initiated. Such signaling will, as discussed below, trigger traffic regulation and flow control to be applied at an upstream node thereby reducing the traffic burden on the current node. When ETR is not used traffic flow processing proceeds directly from step 504 to step 508.

In step 508, the traffic classifier 218 is used to classify the individual incoming traffic flows to corresponding classes. The classes correspond to either elastic traffic, e.g., TCP traffic, or best effort traffic, e.g., UDP traffic. Processing then proceeds to step 510 which represents a fork for the processing of flows falling into either elastic or best effort classes.

Individual elastic flows, e.g., TCP flows, proceed from processing fork 510 to step 512 wherein each individual elastic flow is analyzed to determine if it is responsive to congestion signals, e.g., ECN or packet dropping.

Due to the congestion control avoidance scheme implemented in elastic protocol such as TCP, elastic traffic will normally decrease its packet send rate in response to congestion signals. This responsiveness will be reflected, and can be detected, by a decrease in the arrival rate of packets from the source at the nodes through which the traffic flows.

In the case of N-Dos attacks, due to the use of spoofed IP addresses, some malicious sources may not respond to congestion signals. Other malicious sources without IP-spoofing may intentionally ignore congestion signals. despite an ever increasing number of dropped packets. Such traffic flows are identified in step 512 as non-responsive, e.g., from their arrival rates which are higher than expected decreasing rate.

In one exemplary embodiment detection of responsiveness of a flow is derived from a specific TCP-friendly-traffic behavior, which is bound to a definite end-to-end congestion control and avoidance scheme—

$$T \leq \frac{1.5\sqrt{2/3} * B}{R * \sqrt{p}};$$

where T is the maximum sending rate, B is the number of packet sent, R is the round-trip-time, and p is the packet dropping-rate.

In the exemplary embodiment the above behavior is checked in step 512 by measuring the relationship of packet-dropping rate p and packet arrival rate T. In the case of responsive TCP traffic when a packet dropping rate increases to a factor of $\sqrt{x}$, the packet arrival rates should decrease by a factor of $a*\sqrt{x}$; where a is an adjusting argument in considering link saturation situation and where a is usually $a \leq 1$. Failure to detect the expected decrease in packet arrival rates results in a determination that a flow is non-responsive.

The recycling table 214 is used to record responsive elastic flow information for each class. The information includes data such as <source IP address>, <time-stamp>. Oldest flow records may be replaced by the newest record when the table is full. The table size may be restricted the amount of memory the network node can afford to allocate to this use. The responsiveness of an elastic flow in the table may be checked every time the next packet of the same flow arrives.

Processing of non-responsive flows proceeds from step 512 to step 520 wherein the non-responsive flows are blocked. The processing of the received packets corresponding to a non-responsive flow then stops in step 530.

If in step 512, an elastic traffic flow is determined to be responsive to congestion signaling, the flow is considered allowable and flow processing operation proceeds to step 516.

Best effort traffic is not expected to vary its data rate in response to the dropping of packets. For this reason, best effort traffic is not analyzed for responsiveness and is considered to be allowable traffic. Accordingly, for flows determined to correspond to best effort traffic, operation proceeds directly from step 510 to step 516.

Each of the allowable traffic flows or flow-groups is compared to the corresponding baseline for a flow of the same class and time, e.g., as indicated by the time and day of the week.

Allowable flows, i.e., best effort and responsive elastic traffic flows, having a flow rate equal to, or less than the corresponding baseline flow rate to which they are compared, are categorized as non-aggressive. Processing of non-aggressive flows proceeds to step 527 wherein the packets are forwarded.

However, allowable flows which have current flow rates exceeding the corresponding baseline flow rates are categorized as aggressive and identified for forced reductions in their flow rates. Processing of aggressive allowable flows proceeds from step 516 to step 518 wherein the forwarding rates of the aggressive flows are regulated, e.g., by dropping packets from the aggressive flows.

Figure 8:
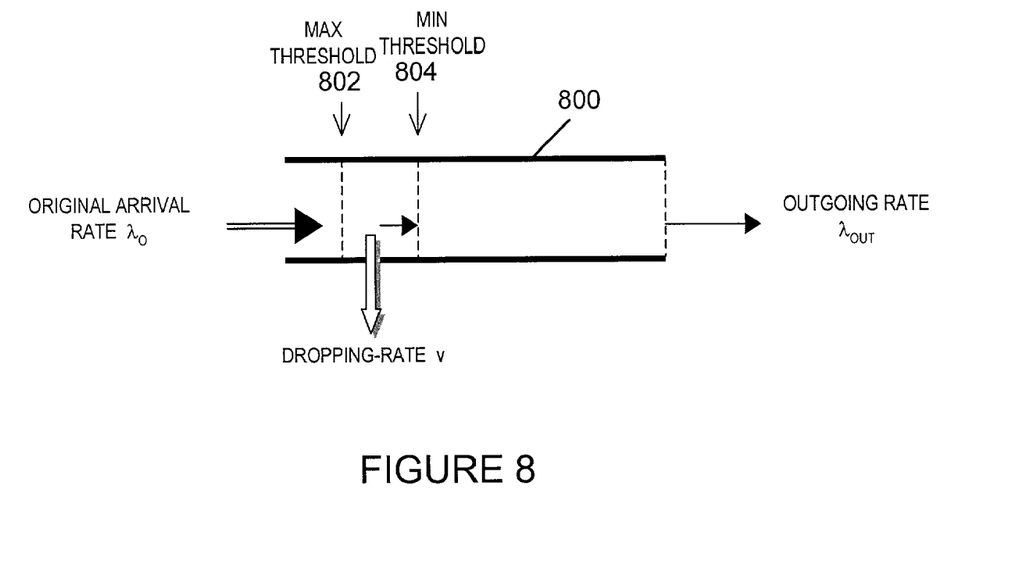
FIG. 8 illustrates the dropping of packets from a queue in accordance with the invention.

In step 518, the packet forwarding rates of each aggressive flow is regulated separately as a function of the flow's determined current flow rate and the corresponding baseline flow rate. Forced reduction in a flows forwarding rate is implemented by adjusting the maximum threshold 802 of the queue 800 of a flow or flow group as shown in FIG. 8. The forced flow forwarding rate reduction is achieved, in one embodiment of the invention, by dropping the required number of received packets from the aggressive flows packet forwarding queue. The drop rate, e.g., penalization severity, for each aggressive flow is affected by the packet arrival rate of the flow. The higher the packet arrival rate of the flow above the baseline flow rate, the higher the applied packet drop rate will be.

FIG. 8 illustrates a flow rate reduction technique which can be applied in step 518 to allowable aggressive flows in accordance with the invention to control packet drop rates as applied to a packet queue 800. As discussed above the packets corresponding to individual aggressive flows are stored in different packet queues. In FIG. 8 an exemplary flow rate reduction technique uses two different thresholds, which are queue fullness thresholds to control packet drop rates, a min threshold 804 and max threshold 806.

In the FIG. 8 example, The packet dropping-rate v is affected by the packet forwarding-rate $\lambda_{out}$, which in turn is bound to the class baselines.

The relationship of the packet dropping rate and the maximum threshold is presented in Formula 1.

$$newmaxThresh(t) = \frac{[x(t)-1]*minThresh(t-\Delta t)+maxThresh(t-\Delta t)}{x(t)} \quad 1$$

Where the x(t) is the change factor of packet dropping rate v(t) within time frame $\Delta t$:

$$x(t) = \frac{v(t)}{v(t-\Delta t)}.$$

In step 518, the forwarding rates are regulated by a penalty factor k, which may be preset, e.g., to two $$--\lambda(t) = \frac{\lambda(t-\Delta t)}{k}.$$

This calculation can be implemented using a shift operation with little cost. In the above equation $\lambda(t)$ is the packet forwarding rate at time(t) while $\lambda(t-\Delta t)$ is the forwarding rate at time $(t-\Delta t)$.

After flow rate redaction is applied to the aggressive traffic flows, the remaining packets are forwarded in step 529. Processing of a set of received packets then stops in step 530.

Thus, in accordance with the present invention, packets corresponding to elastic non-responsive traffic will be blocked, i.e., it will not be forwarded. In addition, packets corresponding to elastic responsive flows and best effort flows will be passed subject to forced reductions in their flow rates when the flows exceed the baseline flow rates for flows of the same class of traffic.

Notably, in accordance with the invention the more aggressive the traffic flow, the greater the applied reduction in flow forwarding rate. Accordingly, while flows having flow rates within the normal baseline will be forwarded with less constraint during periods of congestion, flows with higher flow rates will be subjected to higher forwarding rate reduction. Thus, the flows corresponding to a N-DoS attack are more likely to be penalized do to their distinct traffic behavior which differs from that of legitimate normal flows.

Figure 6:
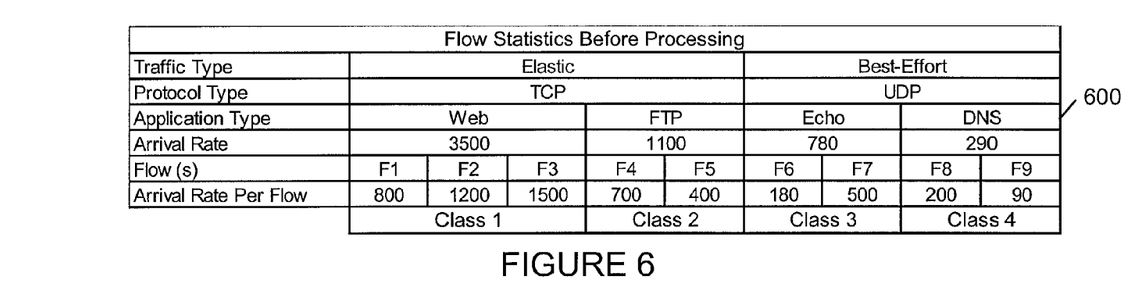
FIG. 6 illustrates an exemplary set of internet traffic statistics measured right during a period of potential congestion collapse at a bottleneck node.

FIG. 6 illustrates a set of flow statistics corresponding to nine different flows (F1 through F9) received by a node implementing the AFFC mechanism of the present invention. The nine flows correspond to four classes Class 1 through Class 4. For purposes of explaining the invention, it will be assumed that the baselines shown in FIG. 4 represent the current flow rate baselines for the four classes.

Figure 7:
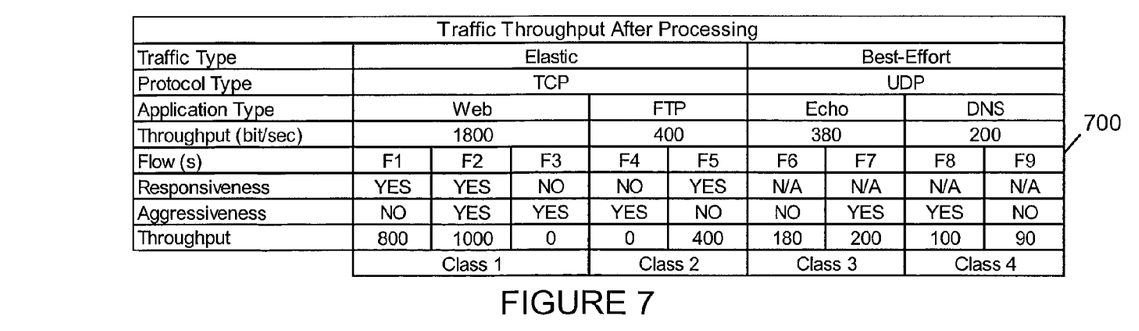
FIG. 7 illustrates an exemplary set of router throughput statistics resulting from the AFFC method of the invention being applied at a bottleneck node to the flows listed in FIG. 6.

FIG. 7 illustrates the exemplary results of applying the flow control methods of the invention to the nine flows illustrated in FIG. 6. The second from last row of FIG. 7 shows the flow throughputs for each of the nine flows after AFFC processing. Notice that if the congestion still continues, the AFFC flow regulation will continue with the penalty ratio k on flow forwarding rates $$--\lambda(t) = \frac{\lambda(t-\Delta t)}{k}.$$

In the case where the node is still saturated after application of the flow reduction techniques of the invention, additional packets may be dropped until the total volume of the flows equals the node's forwarding capacity. The dropping of such additional packets occurs in forwarding step 527 when necessary.

Flows F1 through F3 correspond to Class 1 traffic, i.e., TCP/Web traffic directed to destination D2. From FIG. 4 it can be seen that the baseline flow rate for Class 1 traffic in the example is 1000 bits/s.

Flow F1 is found to be elastic responsive traffic having a flow arrival rate (800 bits/s) which is less than the baseline flow rate (1000 bits/s) for class 1 traffic. Accordingly, no reduction is applied to the forwarding rate of flow F1.

Flow F2 is found to be elastic responsive traffic having a received flow rate (1200 bits/s) which is higher than the baseline flow rate (1000 bits/s) for class 1 traffic. Accordingly, forced flow rate reduction, e.g., dropping of packets, is applied to flow F2 to reduce its forwarding flow rate to the baseline of 1000 bits/s.

Flow F3 is found to be elastic non-responsive traffic. Accordingly, the packets of Flow F3 are dropped, i.e., they are not forward.

Flows F4 and F5 correspond to Class 2 traffic, i.e., TCP/FTP traffic directed to destination D2. From FIG. 4 it can be seen that the baseline flow rate for Class 2 traffic in the example is 500 bits/s.

Flow F4 is found to be elastic non-responsive traffic. Accordingly, the packets of Flow F4 are dropped, i.e., they are not forward.

Flow F5 is found to be elastic responsive traffic having a received flow rate (400 bits/s) which is lower than the applicable baseline flow rate (500 bits/s) for class 2 traffic. Accordingly, no reduction is applied to the flow rate of flow F5.

Flows F6 thorough F9 correspond to best effort traffic, which does not have congestion control/avoidance scheme implemented in the protocol. Accordingly, responsiveness to congestion signals is not an issue with regard to these flows. Flows F6 and F7 correspond to Class 3 traffic, i.e., UDP/Echo traffic directed to destination D2. From FIG. 4 it can be seen that the baseline flow rate for Class 3 traffic in the example is 200 bits/sec. Flows F8 and F9 correspond to Class 4 traffic, i.e., UDP/DNS traffic directed to destination D2. From FIG. 4 it can be seen that the baseline flow rate for Class 4 traffic in the example is 100 bits/sec.

Flow F6 is found to be best effort traffic having a received flow rate (180 bits/s) which is lower than the applicable baseline flow rate (200 bits/s) for class 3 traffic. Accordingly, no reduction is applied to the flow rate of flow F6.

Flow F7 is found to be best effort traffic having an arrival rate (500 bits/s) which is higher than the baseline flow rate (200 bits/s) for class 3 traffic. Accordingly, forced flow rate reduction, e.g., dropping of packets, is applied to flow F7 to reduce its flow rate to the baseline flow rate of 2000 bits/s.

Flow F8 is found to be best effort traffic having an arrival rate (200 bits/s) which is higher than the baseline flow rate (100 bits/s) for class 4 traffic. Accordingly, forced flow rate reduction, e.g., dropping of packets, is applied to flow F8 to reduce its flow rate to the applicable baseline flow rate of 100 bits/s.

Flow F9 is found to be best effort traffic having an arrival rate (90 bits/s) which is lower than the applicable baseline flow rate (100 bits/s) for class 4 traffic. Accordingly, no reduction is applied to the flow rate of flow F9.

Altogether, in the FIG. 7 example 2890 out of 5670 bits of data were dropped. The benefits of the AFFC method can be seen from this example.

Numerous variations on the above described methods and apparatus are possible without departing from the scope of the invention.

What is claimed is:

1. A method of controlling a network node to process a plurality of packet flows, the method comprising:
   receiving packets corresponding to a flow;
   determining if the packets in the flow correspond to a communications protocol which is responsive to congestion signaling;
   when said flow is determined to include packets corresponding to a communications protocol which is responsive to congestion signaling:
      determining if the flow performs in a manner indicating that the flow is responsive to congestion signaling;
      forwarding at least some received packets corresponding to the flow when it is determined that the flow performs in a manner indicating that it is responsive to congestion signaling; and
      blocking the packets from the flow when the flow is determined to perform in a manner indicating that it is non-responsive to congestion signaling.

2. The method of claim 1, wherein the step of determining if the packets in said flow correspond to a communications protocol which is responsive to congestion signaling includes:
   checking said flow to determine if it uses the Transmission Control Protocol (TCP).

3. The method of claim 1, wherein determining if the flow performs in a manner indicative of responsive to congestion signaling includes:
   monitoring a flow rate of said flow to determine if the monitored flow rate decreases in response to congestion signaling.

4. The method of claim 3, wherein the monitored flow rate is a packet arrival rate at said network node.

5. The method of claim 4, wherein said congestion signaling includes dropped packet information.

6. The method of claim 1, wherein the step of forwarding at least some received packets includes:
   determining if said flow rate of said flow exceeds a baseline flow rate; and
   performing a forced flow rate reduction operation in response to determining that said flow rate of said flow exceeds said baseline flow rate.

7. The method of claim 6, wherein said step of performing a forced flow rate reduction operation includes:
   dropping at least some received packets from said flow thereby resulting in fewer forwarded packets than received packets.

8. A method of controlling a network node to process a plurality of packet flows, the method comprising:
   receiving packets corresponding to a flow;
   determining if the packets in the flow correspond to a communications protocol which is responsive to congestion signaling;
   when said flow is determined to include packets corresponding to a communications protocol which is responsive to congestion signaling:
      determining if the flow performs in a manner indicating that the flow is responsive to congestion signaling;
      forwarding at least some received packets corresponding to the flow when it is determined that the flow performs in a manner indicating that the flow is responsive to congestion signaling; and
      blocking the packets from the flow when the flow is determined to perform in a manner indicating that it is non-responsive to congestion signaling; and
   generating a flow rate baseline for a class of flows received by said node, the step of generating a flow rate baseline including:
      i) monitoring a plurality of flow rates, each one of the plurality of flow rates being for one of a plurality of flows in said class, received by said node over a period of time; and
      ii) processing said monitored flow rates to generate a composite flow rate for a flow in said class.

9. The method of claim 8, wherein said composite flow rate is an average flow rate.

10. The method of claim 9, wherein said average flow rate is a smoothed average flow rate.

11. The method of claim 1, further comprising:
    receiving packets corresponding to an additional flow;
    determining if the packets in the additional flow correspond to a communications protocol which is responsive to congestion signaling;
    when said additional flow is determined to include packets corresponding to a communications protocol which is non-responsive to congestion signaling:
       forwarding at least some received packets in said additional flow.

12. The method of claim 11, wherein the step of forwarding at least some received packets in said additional flow includes:
    determining if a flow rate of said additional flow exceeds an additional baseline flow rate; and
    performing a forced flow rate reduction operation in response to determining that said flow rate of said additional flow exceeds said additional baseline flow rate.

13. The method of claim 12, wherein said step of performing a forced flow rate reduction operation includes:
    dropping at least some received packets from said additional flow thereby resulting in fewer forwarded packets in said additional flow than received packets.

14. The method of claim 11, wherein the step of determining if the packets in the additional flow correspond to a communications protocol which is responsive to congestion signaling includes the step of:
    determining whether said additional flow includes packets which are to be delivered using best effort techniques.

* * * * *